United States Patent
Fei et al.

(10) Patent No.: US 10,811,899 B2
(45) Date of Patent: Oct. 20, 2020

(54) POWER SWITCHING CIRCUIT

(71) Applicants: Faraday Technology Corporation, Suzhou (CN); FARADAY TECHNOLOGY CORPORATION, Hsinchu (TW)

(72) Inventors: Xiao-Dong Fei, Hsinchu (TW); Zheng-Xiang Wang, Hsinchu (TW); Song-Rong Han, Hsinchu (TW); Wei Wang, Hsinchu (TW)

(73) Assignees: FARADAY TECHNOLOGY CORPORATION, Suzhou, Jiangsu Province (CN); Faraday Technology Corp., Hsin-Chu (TW)

( * ) Notice: Subject to any disclaimer, the term of this patent is extended or adjusted under 35 U.S.C. 154(b) by 0 days.

(21) Appl. No.: 16/435,917

(22) Filed: Jun. 10, 2019

(65) Prior Publication Data
US 2020/0203990 A1    Jun. 25, 2020

(30) Foreign Application Priority Data
Dec. 19, 2018   (CN) .......................... 2018 1 1556991

(51) Int. Cl.
*H02J 9/06* (2006.01)
*G05F 1/59* (2006.01)
*G06F 1/26* (2006.01)

(52) U.S. Cl.
CPC ............... *H02J 9/061* (2013.01); *G05F 1/59* (2013.01); *G06F 1/263* (2013.01)

(58) Field of Classification Search
CPC ............. H02J 9/061; G05F 1/59; G06F 1/263

USPC .......................................................... 307/66
See application file for complete search history.

(56) References Cited

U.S. PATENT DOCUMENTS

| 4,730,121 A | 3/1988 | Lee et al. |
| 2009/0146499 A1* | 6/2009 | Takeda .................. G11C 16/30 307/80 |
| 2010/0013547 A1* | 1/2010 | Oka .................... H03K 19/0016 327/530 |
| 2015/0171858 A1* | 6/2015 | Matsuoka .......... H03K 3/35613 327/109 |

FOREIGN PATENT DOCUMENTS

EP        0843398 A2    5/1998

* cited by examiner

*Primary Examiner* — Metasebia T Retebo
(74) *Attorney, Agent, or Firm* — Winston Hsu

(57) ABSTRACT

A power switching circuit receives a first power, a second power and a switching signal, and generates an output power. The power switching circuit includes a first power path and a second power path. The first power path is connected with the first power. The second power path is connected with the second power. When the switching signal in a logic high level, the first power path is in a conducting state and the second power path is in a non-conducting state. Consequently, the first power is selected as the output power by the power switching circuit. When the switching signal in a logic low level, the first power path is in the non-conducting state and the second power path is in the conducting state. Consequently, the second power is selected as the output power by the power switching circuit.

7 Claims, 3 Drawing Sheets

POWER SWITCHING CIRCUIT

This application claims the benefit of People's Republic of China Patent Application No. 201811556991.6, filed Dec. 19, 2018, the subject matter of which is incorporated herein by reference.

FIELD OF THE INVENTION

The present invention relates to a switching circuit, and more particularly to a power switching circuit.

BACKGROUND OF THE INVENTION

FIG. 1 schematically illustrates the architecture of a conventional power switching circuit. The power switching circuit 100 receives a main power Vmain and a battery power Vbat and generates an output power Vout. After one of the main power Vmain and the battery power Vbat is selected as the output power Vout by the power switching circuit 100, the output power Vout is provided to a backend electronic device 102.

Generally, the power switching circuit 100 automatically selects the higher-voltage power as the output power Vout. For example, if the voltage of the main power Vmain is higher than the voltage of the battery power Vbat, the main power Vmain is selected as the output power Vout. Whereas, if the voltage of the battery power Vbat is higher than the voltage of the main power Vmain, the battery power Vbat is selected as the output power Vout.

However, in some situations, it is necessary to retain the electric energy of the battery power. Regardless of whether the voltage of the main power Vmain is higher than the voltage of the battery power Vbat, if the main power Vmain is able to continuously provide the electric energy and the voltage of the main power Vmain is sufficient to power the backend electronic device, the main power Vmain is selected as the output power Vout and transmitted to the electronic device by the power switching circuit 100.

SUMMARY OF THE INVENTION

An embodiment of the present invention provides a power switching circuit. The power switching circuit receives a first power, a second power and a switching signal, and generates an output power. The power switching circuit includes a first transistor, a second transistor, a third transistor, a fourth transistor, a first level processing circuit, a second level processing circuit, and a third level processing circuit. A first source/drain terminal of the first transistor is connected with the first power. A gate terminal of the first transistor receives a first gate control signal. A first source/drain terminal of the second transistor is connected with a second source/drain terminal of the first transistor. A gate terminal of the first transistor receives a second gate control signal. A second source/drain terminal of the second transistor is connected with a first node. A first source/drain terminal of the third transistor is connected with the second power. A gate terminal of the third transistor receives a third gate control signal. A first source/drain terminal of the fourth transistor is connected with a second source/drain terminal of the third transistor. A gate terminal of the third transistor receives a fourth gate control signal. A second source/drain terminal of the fourth transistor is connected with the first node. The first node generates the output power. A power terminal of the first level processing circuit is connected with the first power. An input terminal of the first level processing circuit receives the switching signal. An output terminal of the first level processing circuit generates the first gate control signal. When the switching signal in a logic low level, a voltage of the first gate control signal is equal to a voltage of the first power. When the switching signal in a logic high level, the first gate control signal in the logic low level. A power terminal of the second level processing circuit is connected with the output power. An input terminal of the second level processing circuit receives the switching signal. A first output terminal of the second level processing circuit generates the second gate control signal. A second output terminal of the second level processing circuit generates the fourth gate control signal. When the switching signal in the logic low level, a voltage of the second gate control signal is equal to a voltage of the output power, and the fourth gate control signal in the logic low level. When the switching signal in the logic high level, the second gate control signal in the logic low level, and the voltage of the fourth gate control signal is equal to the voltage of the output power. A power terminal of the third level processing circuit is connected with the second power. An input terminal of the third level processing circuit receives the switching signal. An output terminal of the third level processing circuit generates the third gate control signal. When the switching signal in the logic low level, the third gate control signal in the logic low level. When the switching signal in the logic high level, a voltage of the third gate control signal is equal to a voltage of the second power.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
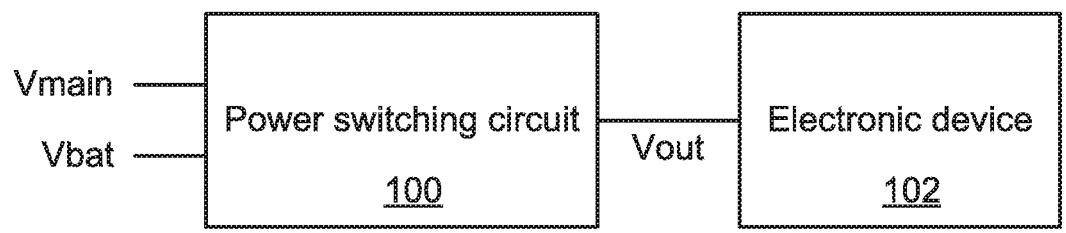
FIG. 1 (prior art) schematically illustrates the architecture of a conventional power switching circuit.
Figure 2:
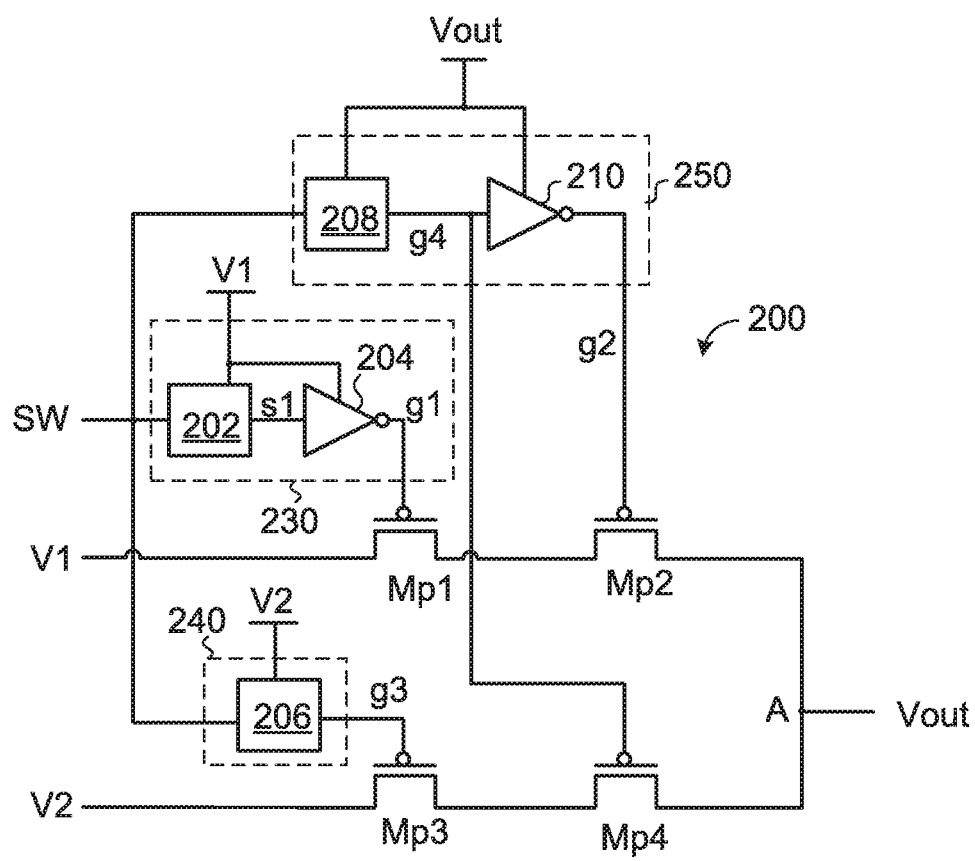
FIG. 2 is a schematic circuit diagram illustrating a power switching circuit according to a first embodiment of the present invention.

FIG. 2 is a schematic circuit diagram illustrating a power switching circuit according to a first embodiment of the present invention. The power switching circuit 200 receives a first power V1, a second power V2 and a switching signal SW. For example, the first power V1 is a main power, and the second power V2 is a battery power. According to the switching signal SW, one of the first power V1 and the second power V2 is selected as an output power Vout by the power switching circuit 200.

In this embodiment, the power switching circuit 200 comprises transistors Mp1~Mp4 and level processing circuits 230, 240, 250. The level processing circuit 230 comprises a level shifter 202 and an inverter 204. The level processing circuit 240 comprises a level shifter 206. The level processing circuit 250 comprises a level shifter 208 and an inverter 210.

The power terminal of the level shifter 202 is connected with the first power V1. The input terminal of the level shifter 202 receives the switching signal SW. The output terminal of the level shifter 202 generates a first signal s1. The power terminal of the inverter 204 is connected with the first power V1. The input terminal of the inverter 204 receives the first signal s1. The output terminal of the inverter 204 generates a gate control signal g1.

The power terminal of the level shifter 206 is connected with the second power V2. The input terminal of the level shifter 206 receives the switching signal SW. The output terminal of the level shifter 206 generates a gate control signal g3.

The power terminal of the level shifter 208 receives the output power Vout. The input terminal of the level shifter 208 receives the switching signal SW. The output terminal of the level shifter 208 generates a gate control signal g4. The power terminal of the inverter 210 receives the output power Vout. The input terminal of the inverter 210 receives the gate control signal g4. The output terminal of the inverter 210 generates a gate control signal g2.

A first power path is defined by the transistors Mp1 and Mp2 collaboratively. The first source/drain terminal of the transistor Mp1 is connected with the first power V1. The gate terminal of the transistor Mp1 receives the gate control signal g1. The first source/drain terminal of the transistor Mp2 is connected with the second source/drain terminal of the transistor Mp1. The gate terminal of the transistor Mp2 receives the gate control signal g2. The second source/drain terminal of the transistor Mp2 is connected with the node A.

A second power path is defined by the transistors Mp3 and Mp4 collaboratively. The first source/drain terminal of the transistor Mp3 is connected with the second power V2. The gate terminal of the transistor Mp3 receives the gate control signal g3. The first source/drain terminal of the transistor Mp4 is connected with the second source/drain terminal of the transistor Mp3. The gate terminal of the transistor Mp4 receives the gate control signal g4. The second source/drain terminal of the transistor Mp4 is connected with the node A. Moreover, the output power Vout is outputted from the node A.

In this embodiment, the logic high level of each of the level shifters 202, 206 and 208 is determined according to the received power of the corresponding power terminal. For example, the power terminal of the level shifter 202 is connected with the first power V1, and the voltage of the first power V1 is 3.3V. Consequently, in case that the input terminal of the level shifter 202 receives the logic high level, the output terminal of the level shifter 202 generates the logic high level (3.3V). Whereas, in case that the input terminal of the level shifter 202 receives the logic low level (0V), the output terminal of the level shifter 202 generates the logic low level (0V).

Similarly, the logic high level of each of the inverters 204 and 210 is determined according to the received power of the corresponding power terminal. For example, the power terminal of the inverter 204 is connected with the first power V1, and the voltage of the first power V1 is 3.3V. Consequently, in case that the input terminal of the inverter 204 receives the logic high level, the output terminal of the inverter 204 generates the logic low level (0V). Whereas, in case that the input terminal of the inverter 204 receives the logic low level (0V), the output terminal of the inverter 204 generates the logic high level (3.3V).

The operations of the power switching circuit 200 according to the first power V1 and the second power V2 will be described as follows.

In a first situation, the voltage of the first power V1 and the voltage of the second power V2 are equal (e.g., 3.3V). In case that the switching signal SW in the logic low level, the gate control signal g1 is in the logic high level (3.3V), the gate control signal g2 is in the logic high level (3.3V), the gate control signal g3 is in the logic low level (0V), and the gate control signal g4 is in the logic low level (0V). Under this circumstance, the transistors Mp1 and Mp2 are turned off, and the transistor Mp3 and Mp4 are turned on. Consequently, the first power path is in a non-conducting state, and the second power path is in a conducting state. Since the second power V2 (e.g., 3.3V) is transmitted to the node A, the output voltage Vout is 3.3V. That is, the second power V2 is selected as the output power Vout by the power switching circuit 200.

In case that the switching signal SW in the logic high level, the gate control signal g1 is in the logic low level (0V), the gate control signal g2 is in the logic low level (0V), the gate control signal g3 is in the logic high level (3.3V), and the gate control signal g4 is in the logic high level (3.3V). Under this circumstance, the transistors Mp1 and Mp2 are turned on, and the transistor Mp3 and Mp4 are turned off. Consequently, the first power path is in the conducting state, and the second power path is in the non-conducting state. Since the first power V1 (e.g., 3.3V) is transmitted to the node A, the output voltage Vout is 3.3V. That is, the first power V1 is selected as the output power Vout by the power switching circuit 200.

In the above situation, the voltage of the first power V1 and the voltage of the second power V2 are equal. In case that the first power path is in the non-conducting state, the gate control signal g1 and the gate control signal g2 are in the logic high level (3.3V). Since the transistors Mp1 and Mp2 are completely turned off, the first power path does not have the extra power consumption. In case that the second power path is in the non-conducting state, the gate control signal g3 and the gate control signal g4 are in the logic high level (3.3V). Since the transistors Mp3 and Mp4 are completely turned off, the second power path does not have the extra power consumption.

In a second situation, the voltage of the first power V1 is lower than the voltage of the second power V2. For example, the voltage of the first power V1 is 2V, and the voltage of the second power V2 is 3.3V. In case that the switching signal SW in the logic low level, the gate control signal g1 is in the logic high level (2V), the gate control signal g2 is in the logic high level (3.3V), the gate control signal g3 is in the logic low level (0V), and the gate control signal g4 is in the logic low level (0V). Under this circumstance, the transistors Mp1 and Mp2 are turned off, and the transistor Mp3 and Mp4 are turned on. Consequently, the first power path is in a non-conducting state, and the second power path is in a conducting state. Since the second power V2 (e.g., 3.3V) is transmitted to the node A, the output voltage Vout is 3.3V. That is, the second power V2 is selected as the output power Vout by the power switching circuit 200.

In case that the switching signal SW in the logic high level, the gate control signal g1 is in the logic low level (0V), the gate control signal g2 is in the logic low level (0V), the gate control signal g3 is in the logic high level (3.3V), and the gate control signal g4 is in the logic high level (2V). Under this circumstance, the transistors Mp1 and Mp2 are turned on, and the transistor Mp3 and Mp4 are turned off. Consequently, the first power path is in the conducting state, and the second power path is in the non-conducting state. Since the first power V1 (e.g., 2V) is transmitted to the node A, the output voltage Vout is 2V. That is, the first power V1 is selected as the output power Vout by the power switching circuit 200.

In the above situation, the voltage of the first power V1 is lower than the voltage of the second power V2. In case that the switching signal SW in the logic low level, the transistor Mp1 is not completely turned off by the gate control signal g1 (2V), but the transistor Mp2 is completely turned off by the gate control signal g2 (3.3V). Consequently, the first power path in the non-conducting state does not have the extra power consumption. Similarly, in case that the switching signal SW in the logic high level, the transistor Mp4 is not completely turned off by the gate control signal g4 (2V), but the transistor Mp3 is completely turned off by the gate control signal g3 (3.3V). Consequently, the second power path in the non-conducting state does not have the extra power consumption.

In a second situation, the voltage of the first power V1 is higher than the voltage of the second power V2. For example, the voltage of the first power V1 is 3.3V, and the voltage of the second power V2 is 2V. In case that the switching signal SW in the logic low level, the gate control signal g1 is in the logic high level (3.3V), the gate control signal g2 is in the logic high level (2V), the gate control signal g3 is in the logic low level (0V), and the gate control signal g4 is in the logic low level (0V). Under this circumstance, the transistors Mp1 and Mp2 are turned off, and the transistor Mp3 and Mp4 are turned on. Consequently, the first power path is in a non-conducting state, and the second power path is in a conducting state. Since the second power V2 (e.g., 2V) is transmitted to the node A, the output voltage Vout is 2V. That is, the second power V2 is selected as the output power Vout by the power switching circuit 200.

In case that the switching signal SW in the logic high level, the gate control signal g1 is in the logic low level (0V), the gate control signal g2 is in the logic low level (0V), the gate control signal g3 is in the logic high level (2V), and the gate control signal g4 is in the logic high level (3.3V). Under this circumstance, the transistors Mp1 and Mp2 are turned on, and the transistor Mp3 and Mp4 are turned off. Consequently, the first power path is in the conducting state, and the second power path is in the non-conducting state. Since the first power V1 (e.g., 3.3V) is transmitted to the node A, the output voltage Vout is 3.3V. That is, the first power V1 is selected as the output power Vout by the power switching circuit 200.

In the above situation, the voltage of the first power V1 is higher than the voltage of the second power V2. In case that the switching signal SW in the logic low level, the transistor Mp2 is not completely turned off by the gate control signal g2 (2V), but the transistor Mp1 is completely turned off by the gate control signal g1 (3.3V). Consequently, the first power path in the non-conducting state does not have the extra power consumption. Similarly, in case that the switching signal SW in the logic high level, the transistor Mp3 is not completely turned off by the gate control signal g3 (2V), but the transistor Mp4 is completely turned off by the gate control signal g4 (3.3V). Consequently, the second power path in the non-conducting state does not have the extra power consumption.

From the above descriptions, the power path of the power switching circuit 200 in the non-conducting state does not have the extra power consumption, regardless of whether the voltage of the first power V1 is higher than, lower than or equal to the voltage of the second power V2.

Figure 3:
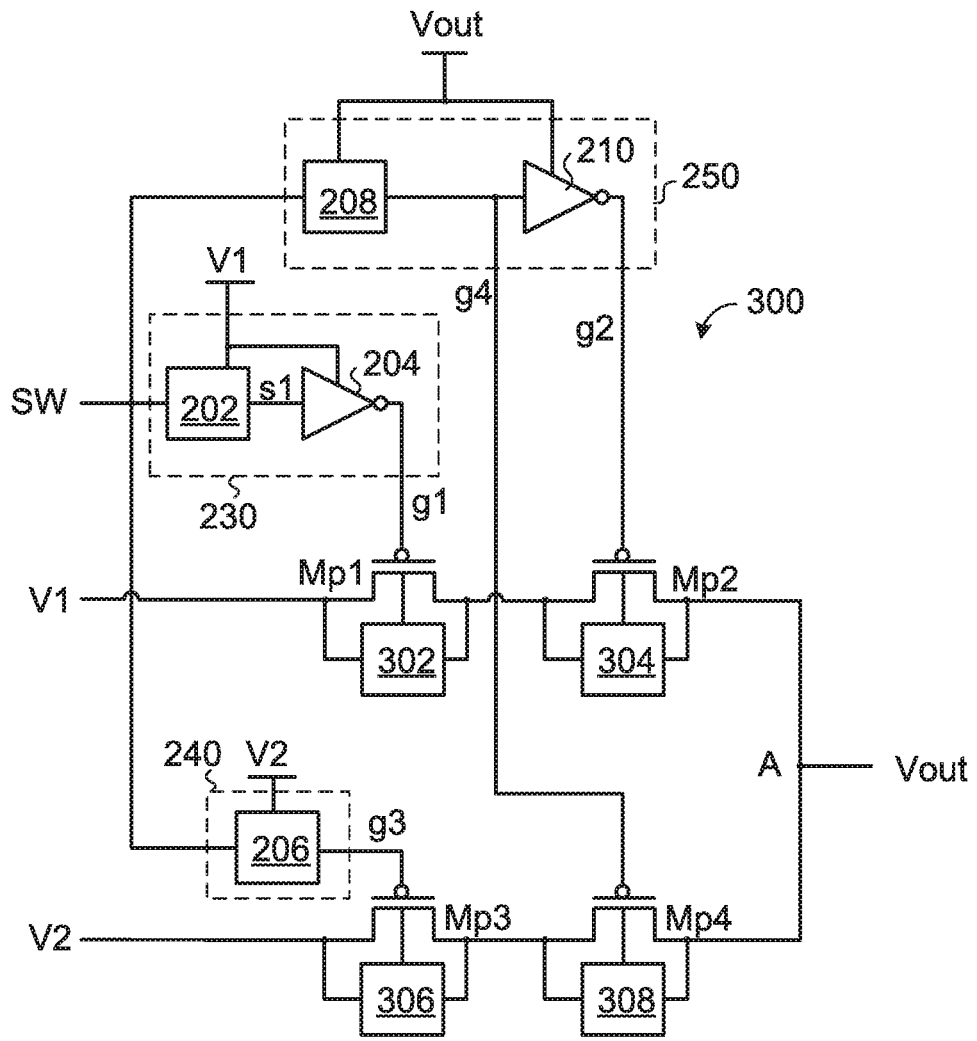
FIG. 3 is a schematic circuit diagram illustrating a power switching circuit according to a second embodiment of the present invention.

FIG. 3 is a schematic circuit diagram illustrating a power switching circuit according to a second embodiment of the present invention. In comparison with the first embodiment, the power switching circuit 300 of this embodiment further comprises body voltage selecting circuits 302, 304, 306 and 308. The operations of the second embodiment are similar to those of the first embodiment, and are not redundantly described herein. Hereinafter, only the body voltage selecting circuits 302, 304, 306 and 308 will be described.

The first terminal of the body voltage selecting circuit 302 is connected with the first source/drain terminal of the transistor Mp1. The second terminal of the body voltage selecting circuit 302 is connected with the second source/drain terminal of the transistor Mp1. The third terminal of the body voltage selecting circuit 302 is connected with the body terminal of the transistor Mp1.

If the voltage of the first terminal of the body voltage selecting circuit 302 is higher than the voltage of the second terminal of the body voltage selecting circuit 302, the voltage of the first terminal of the body voltage selecting circuit 302 is automatically transmitted to the body terminal of the transistor Mp1. Whereas, if the voltage of the first terminal of the body voltage selecting circuit 302 is lower than the voltage of the second terminal of the body voltage selecting circuit 302, the voltage of the second terminal of the body voltage selecting circuit 302 is automatically transmitted to the body terminal of the transistor Mp1. Consequently, the body effect of the transistor Mp1 can be effectively eliminated.

The connection relationships between the body voltage selecting circuit 304, 306 and 308 and the associated transistors are similar to the connection relationship between the body voltage selecting circuit 302 and the transistor Mp1, and are not redundantly described herein.

Figure 4:
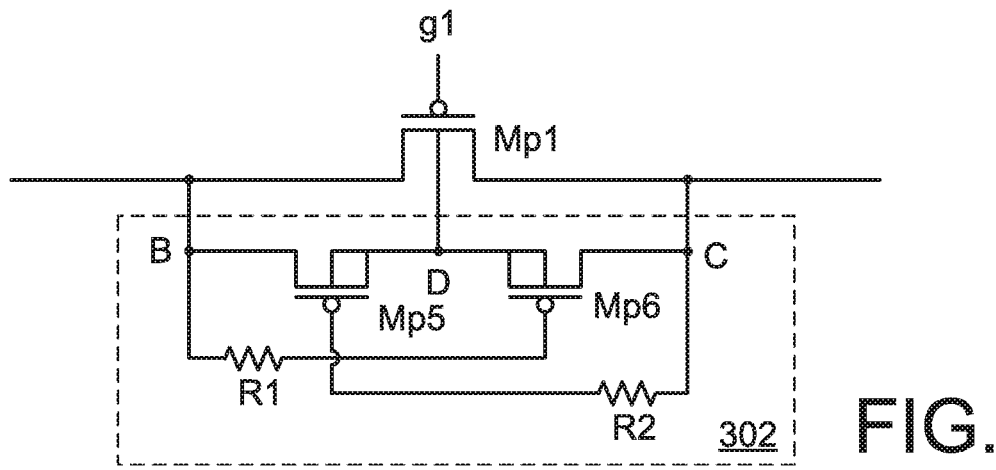
FIG. 4 is a schematic circuit diagram of a body voltage selecting circuit of the power switching circuit according to the second embodiment of the present invention.

FIG. 4 is a schematic circuit diagram of a body voltage selecting circuit of the power switching circuit according to the second embodiment of the present invention. As shown in FIG. 4, the body voltage selecting circuit 302 comprises a transistor Mp5, a transistor Mp6, a resistor R1 and a resistor R2. The node B is the first terminal of the body voltage selecting circuit 302, which is connected with the first source/drain terminal of the transistor Mp1. The node C is the second terminal of the body voltage selecting circuit 302, which is connected with the second source/drain terminal of the transistor Mp1. The node D is the third terminal of the body voltage selecting circuit 302, which is connected with the body terminal of the transistor Mp1.

The first source/drain terminal of the transistor Mp5 is connected with the node B. The second source/drain terminal of the transistor Mp5 is connected with the node D. The body terminal of the transistor Mp5 is connected with the node D. The first source/drain terminal of the transistor Mp6 is connected with the node C. The second source/drain terminal of the transistor Mp6 is connected with the node D. The body terminal of the transistor Mp6 is connected with the node D. The first terminal of the resistor R1 is connected with the node B. The second terminal of the resistor R1 is connected with the gate terminal of the transistor Mp6. The first terminal of the resistor R2 is connected with the node C. The second terminal of the resistor R2 is connected with the gate terminal of the transistor Mp5.

If the voltage of the node B is higher than the voltage of the node C, the transistor Mp6 is turned off and the transistor Mp5 is turned on. Consequently, the voltage of the node B is transmitted to the node D. Whereas, if the voltage of the node B is lower than the voltage of the node C, the transistor Mp6 is turned on and the transistor Mp5 is turned off. Consequently, the voltage of the node C is transmitted to the node D.

Figure 5:
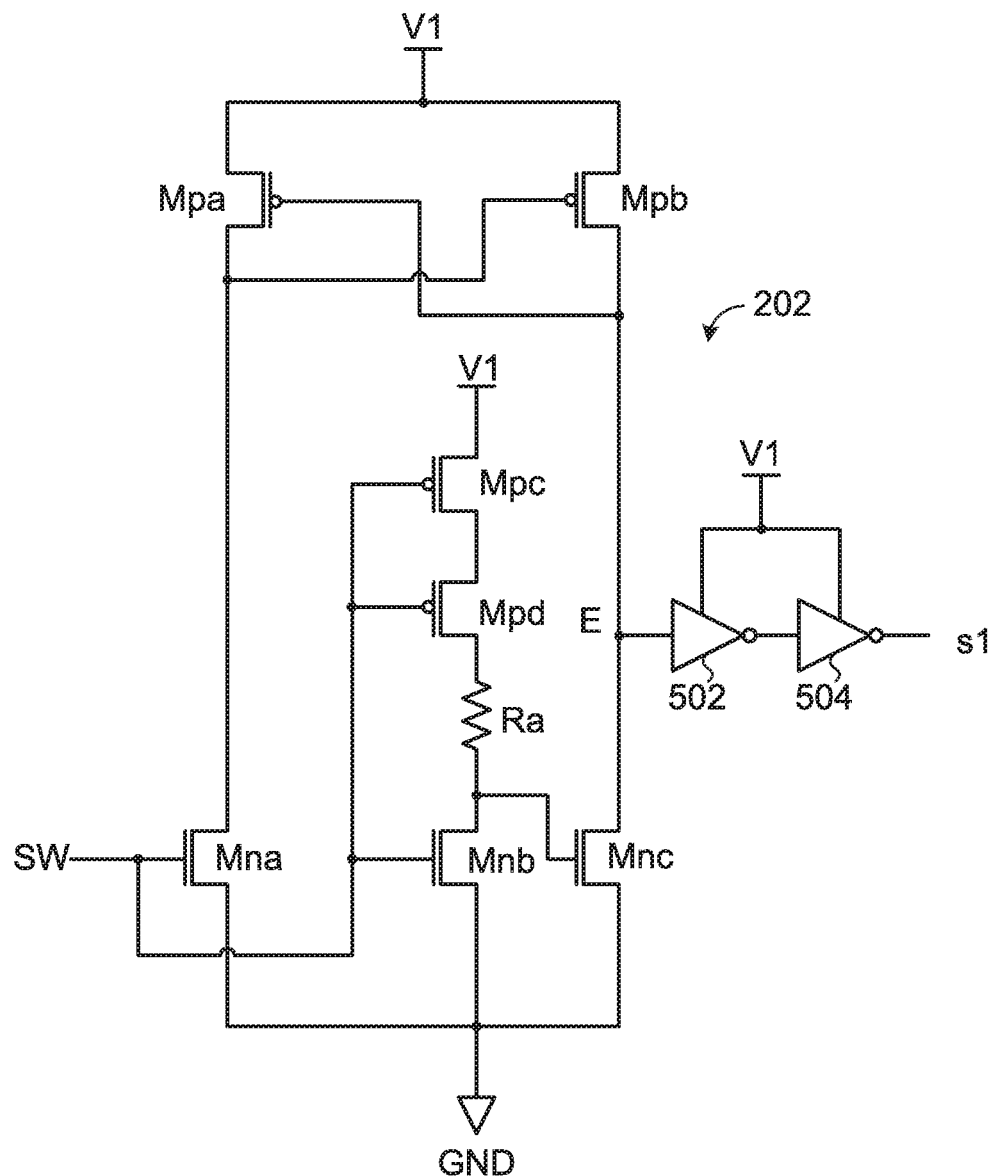
FIG. 5 is a schematic circuit diagram illustrating the level shifter used in the power switching circuit of the present invention.

FIG. 5 is a schematic circuit diagram illustrating the level shifter used in the power switching circuit of the present invention. As shown in FIG. 5, the level shifter 202 comprises transistors Mpa, Mpb, Mpc, Mpd, transistors Mna, Mnb, Mnc, inverters 502, 503, 504, and a resistor Ra. The power terminal of the level shifter 202 is connected with the first power V1. The input terminal of the level shifter 202 receives the switching signal SW. The output terminal of the level shifter 202 generates the first signal s1.

The first source/drain terminal of the transistor Mpa is connected with the first power V1. The first source/drain terminal of the transistor Mpb is connected with the first power V1. The second source/drain terminal of the transistor Mpb is connected with the gate terminal of the transistor Mpa and the node E. The gate terminal of the transistor Mpb is connected with the second source/drain terminal of the transistor Mpa.

The first source/drain terminal of the transistor Mna is connected with the second source/drain terminal of the transistor Mpa. The second source/drain terminal of the transistor Mna is connected with the ground terminal GND. The gate terminal of the transistor Mna receives the switching signal SW.

The first source/drain terminal of the transistor Mpc is connected with the first power V1. The gate terminal of the transistor Mpc receives the switching signal SW. The first source/drain terminal of the transistor Mpd is connected with the second source/drain terminal of the transistor Mpc. The gate terminal of the transistor Mpd receives the switching signal SW. The first terminal of the resistor Ra is connected with the second source/drain terminal of the transistor Mpd. The first source/drain terminal of the transistor Mnb is connected with the second terminal of the resistor Ra. The second source/drain terminal of the transistor Mnb is connected with the ground terminal GND. The gate terminal of the transistor Mnb receives the switching signal SW.

The first source/drain terminal of the transistor Mnc is connected with the node E. The second source/drain terminal of the transistor Mnc is connected with the ground terminal GND. The gate terminal of the transistor Mnc is connected with the first source/drain terminal of the transistor Mnb.

The power terminal of the inverter 502 is connected with the first power V1. The input terminal of the inverter 502 is connected with the node E. The power terminal of the inverter 504 is connected with the first power V1. The input terminal of the inverter 504 is connected with the output terminal of the inverter 502. The output terminal of the inverter 504 generates the first signal s1.

For example, the voltage of the first power V1 is 3.3V. In case that the switching signal SW in the logic high level, the transistors Mna, Mnb and Mpb are turned on, the transistors Mpa, Mpc, Mpd and Mnc are turned off, and the node E in the logic high level (3.3V). Consequently, the first signal s1 from the inverter 504 in the logic high level (3.3V).

Whereas, in case that the switching signal SW in the logic low level, the transistors Mna, Mnb and Mpb are turned off, the transistors Mpa, Mpc, Mpd and Mnc are turned n, and the node E in the logic low level (0V). Consequently, the first signal s1 from the inverter 504 in the logic low level (0V).

The circuits of the level shifters 206 and 208 are similar to the level shifter 202, and are not redundantly described herein.

From the above descriptions, the present invention provides a power switching circuit. Each power path of the power switching circuit comprises two transistors. When one power path is in the non-conducting state, at least one transistor of the power path in the non-conducting state is completely turned off. Consequently, no extra power consumption is generated.

The level processing circuits 230, 240 and 250 as shown in FIGS. 2 and 3 are presented herein for purpose of illustration and description only. It is noted that the level processing circuit may be modified and altered. For example, in another embodiment, the level processing circuit comprises an inverter and a level shifter. The signal received by the level processing circuit is inputted into the inverter. The signal outputted from the inverter is inputted into the level shifter. Under this circumstance, the purpose of the present invention is also achievable.

The body voltage selecting circuit as shown in FIG. 4 is presented herein for purpose of illustration and description only. It is noted that the body voltage selecting circuit may be modified and altered. The level shifter as shown in FIG. 4 is presented herein for purpose of illustration and description only. It is noted that the level shifter may be modified and altered.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power switching circuit receiving a first power, a second power and a switching signal and generating an output power, the power switching circuit comprising:
a first transistor, wherein a first source/drain terminal of the first transistor is connected with the first power, and a gate terminal of the first transistor receives a first gate control signal;
a second transistor, wherein a first source/drain terminal of the second transistor is connected with a second source/drain terminal of the first transistor, a gate terminal of the second transistor receives a second gate control signal, and a second source/drain terminal of the second transistor is connected with a first node;
a third transistor, wherein a first source/drain terminal of the third transistor is connected with the second power, and a gate terminal of the third transistor receives a third gate control signal;
a fourth transistor, wherein a first source/drain terminal of the fourth transistor is connected with a second source/drain terminal of the third transistor, a gate terminal of the fourth transistor receives a fourth gate control signal, and a second source/drain terminal of the fourth transistor is connected with the first node, wherein the first node generates the output power;

a first level processing circuit, wherein a power terminal of the first level processing circuit is connected with the first power, an input terminal of the first level processing circuit receives the switching signal, and an output terminal of the first level processing circuit generates the first gate control signal, wherein when the switching signal in a logic low level, a voltage of the first gate control signal is equal to a voltage of the first power, wherein when the switching signal in a logic high level, the first gate control signal in the logic low level;

a second level processing circuit, wherein a power terminal of the second level processing circuit is connected with the output power, an input terminal of the second level processing circuit receives the switching signal, a first output terminal of the second level processing circuit generates the second gate control signal, and a second output terminal of the second level processing circuit generates the fourth gate control signal, wherein when the switching signal in the logic low level, a voltage of the second gate control signal is equal to a voltage of the output power, and the fourth gate control signal in the logic low level, wherein when the switching signal in the logic high level, the second gate control signal in the logic low level, and the voltage of the fourth gate control signal is equal to the voltage of the output power; and a third level processing circuit, wherein a power terminal of the third level processing circuit is connected with the second power, an input terminal of the third level processing circuit receives the switching signal, and an output terminal of the third level processing circuit generates the third gate control signal, wherein when the switching signal in the logic low level, the third gate control signal in the logic low level, wherein when the switching signal in the logic high level, a voltage of the third gate control signal is equal to a voltage of the second power.

2. The power switching circuit as claimed in claim 1, further comprising a first body voltage selecting circuit, wherein a first terminal of the first body voltage selecting circuit is connected with the first source/drain terminal of the first transistor, a second terminal of the first body voltage selecting circuit is connected with the second source/drain terminal of the first transistor, and a third terminal of the first body voltage selecting circuit is connected with a body terminal of the first transistor, wherein the first terminal has a first voltage, the second terminal has a second voltage, and the third terminal forwards a larger voltage between the first voltage and the second voltage to the body terminal of the first transistor.

3. The power switching circuit as claimed in claim 2, wherein the first body voltage selecting circuit comprises:
   a fifth transistor, wherein a first source/drain terminal of the fifth transistor is connected with the first source/drain terminal of the first transistor, and a second source/drain terminal of the fifth transistor is connected with the body terminal of the first transistor;
   a sixth transistor, wherein a first source/drain terminal of the sixth transistor is connected with the second source/drain terminal of the first transistor, and a second source/drain terminal of the sixth transistor is connected with the body terminal of the first transistor;
   a first resistor connected between the first source/drain terminal of the fifth transistor and a gate terminal of the sixth transistor; and
   a second resistor connected between the first source/drain terminal of the sixth transistor and a gate terminal of the fifth transistor.

4. The power switching circuit as claimed in claim 1, wherein the second level processing circuit comprises:
   a first level shifter, wherein a power terminal of the first level shifter receives the output power, an input terminal of the first level shifter receives the switching signal, and an output terminal of the first level shifter generates the fourth gate control signal; and
   a first inverter, wherein a power terminal of the first inverter receives the output power, an input terminal of the first inverter receives the fourth gate control signal, and an output terminal of the first inverter generates the second gate control signal.

5. The power switching circuit as claimed in claim 1, wherein the third level processing circuit comprises a second level shifter, wherein a power terminal of the second level shifter is connected with the second power, an input terminal of the second level shifter receives the switching signal, and an output terminal of the second level shifter generates the third gate control signal.

6. The power switching circuit as claimed in claim 1, wherein the first level processing circuit comprises:
   a third level shifter, wherein a power terminal of the third level shifter is connected with the first power, an input terminal of the third level shifter receives the switching signal, and an output terminal of the third level shifter generates a first signal; and
   a second inverter, wherein a power terminal of the second inverter is connected with the first power, an input terminal of the second inverter receives the first signal, and an output terminal of the second inverter generates the first gate control signal.

7. The power switching circuit as claimed in claim 6, wherein the third level shifter comprises:
   a seventh transistor, wherein a first source/drain terminal of the seventh transistor is connected with the first power;
   an eighth transistor, wherein a first source/drain terminal of the eighth transistor is connected with the first power, a gate terminal of the eighth transistor is connected with a second source/drain terminal of the seventh transistor, and a second source/drain terminal of the eighth transistor is connected with a gate terminal of the seventh transistor and a second node;
   a ninth transistor, wherein a first source/drain terminal of the ninth transistor is connected with the second source/drain terminal of the seventh transistor, a gate terminal of the ninth transistor receives the switching signal, and a second source/drain terminal of the ninth transistor is connected with a ground terminal;
   a tenth transistor, wherein a first source/drain terminal of the tenth transistor is connected with the first power, and a gate terminal of the tenth transistor receives the switching signal;
   an eleventh transistor, wherein a first source/drain terminal of the eleventh transistor is connected with a second source/drain terminal of the tenth transistor, and a gate terminal of the eleventh transistor receives the switching signal;
   a third resistor, wherein a first terminal of the third resistor is connected with a second source/drain terminal of the eleventh transistor;
   a twelfth transistor, wherein a first source/drain terminal of the twelfth transistor is connected with a second terminal of the third resistor, a gate terminal of the twelfth transistor receives the switching signal, and a second source/drain terminal of the twelfth transistor is connected with the ground terminal;

a thirteenth transistor, wherein a first source/drain terminal of the thirteenth transistor is connected with a second node, a gate terminal of the thirteenth transistor is connected with the first source/drain terminal of the twelfth transistor, and a second source/drain terminal of the thirteenth transistor is connected with the ground terminal;

a third inverter, wherein a power terminal of the third inverter is connected with the first power, and an input terminal of the third inverter is connected with the second node; and a fourth inverter, wherein a power terminal of the fourth inverter is connected with the first power, an input terminal of the fourth inverter is connected with an output terminal of the third inverter, and an output terminal of the fourth inverter generates the first signal.

* * * * *